(12) United States Patent
Machii et al.

(10) Patent No.: US 11,482,016 B2
(45) Date of Patent: Oct. 25, 2022

(54) DIVISION LINE RECOGNITION APPARATUS

(71) Applicant: Faurecia Clarion Electronics Co., Ltd., Saitama (JP)

(72) Inventors: Kimiyoshi Machii, Tokyo (JP); Takehito Ogata, Tokyo (JP); Naoki Shimizu, Saitama (JP); Ayano Miyashita, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 0 days.

(21) Appl. No.: 16/979,147

(22) PCT Filed: Feb. 28, 2019

(86) PCT No.: PCT/JP2019/007736
§ 371 (c)(1),
(2) Date: Sep. 8, 2020

(87) PCT Pub. No.: WO2019/172059
PCT Pub. Date: Sep. 12, 2019

(65) Prior Publication Data
US 2020/0410257 A1 Dec. 31, 2020

(30) Foreign Application Priority Data
Mar. 9, 2018 (JP) .............................. JP2018-043554

(51) Int. Cl.
*G06V 20/56* (2022.01)
*G06K 9/62* (2022.01)
(Continued)

(52) U.S. Cl.
CPC ......... *G06V 20/588* (2022.01); *G06K 9/6268* (2013.01); *G06V 10/44* (2022.01); *G06V 10/50* (2022.01)

(58) Field of Classification Search
CPC ...... G06V 20/588; G06V 10/50; G06V 10/55; G06K 9/6268
See application file for complete search history.

(56) References Cited

U.S. PATENT DOCUMENTS 9,074,906 B2 7/2015 Higuchi et al.
2003/0103649 A1* 6/2003 Shimakage ............... G06T 7/11
382/104
(Continued)

FOREIGN PATENT DOCUMENTS

JP 8-272933 A 10/1996
JP 2005-157731 A 6/2005
(Continued)

OTHER PUBLICATIONS

Extended European Search Report dated Nov. 5, 2021 for corresponding counterpart European Application No. 19763894.3 (9 pages).
(Continued)

*Primary Examiner* — Nancy Bitar
(74) *Attorney, Agent, or Firm* — Reising Ethington, P.C.

(57) ABSTRACT

An apparatus for recognizing a division line on a road from an image captured by a camera includes: a processing area setting unit to set a processing area to the image; a statistics calculation unit to calculate statistics of the image in the processing area; a threshold value setting unit to set a plurality of threshold values on the basis of the statistics; a division line feature point extraction unit to classify a plurality of pixels contained in the image on the basis of the white line threshold value and the road surface threshold value and extracts feature points of the division line on the basis of classification results of the plurality of pixels; and a division line decision unit configured to decide the division (Continued)

line on the basis of the feature points extracted by the division line feature point extraction unit.

7 Claims, 13 Drawing Sheets

(51) Int. Cl.
*G06V 10/44* (2022.01)
*G06V 10/50* (2022.01)

(56) References Cited

U.S. PATENT DOCUMENTS

| | | | | |
|---|---|---|---|---|
| 2012/0050489 | A1* | 3/2012 | Gupta | G06V 20/588 |
| | | | | 348/46 |
| 2015/0363668 | A1* | 12/2015 | Kato | G06V 20/588 |
| | | | | 382/104 |
| 2016/0171314 | A1* | 6/2016 | Shao | G06V 10/56 |
| | | | | 382/104 |
| 2016/0314359 | A1 | 10/2016 | Sakamoto | |
| 2018/0197022 | A1* | 7/2018 | Fujikawa | H04N 7/18 |
| 2018/0300549 | A1* | 10/2018 | Xia | G06V 30/194 |

FOREIGN PATENT DOCUMENTS

| | | |
|---|---|---|
| JP | 2009-015611 A | 1/2009 |
| JP | 2011-028659 A | 2/2011 |
| JP | 2016-206721 A | 12/2016 |
| JP | 2016-206881 A | 12/2016 |
| JP | 2017-021747 | 1/2017 |

OTHER PUBLICATIONS

Chiu et al. (2005) "Lane Detection using Color-Based Segmentation,"Intelligent Vehicles Symposium, Proceedings. IEEE, Las Vegas, NV, USA Jun. 6-8, 2005, Piscataway, NJ, USA, IEEE, Piscataway, NJ, USA, Jun. 6, 2005, pp. 706-711.

Apostoloff et al. (Aug. 2, 2004) "Vision based lane tracking using multiple cues and particle filtering," The Australian National University, Department of Systems Engineering Research School of Information Sciences and Engineering, pp. 1-170. Retrieved May 14, 2014 from the internet: URL: http://citeseerx.ist.psu.edu/viewdoc/download?

Japanese Office Action dated Jul. 13, 2021 regarding Japanese Patent Application No. 2018-043554 corresponding to U.S. Appl. No. 16/979,147 (12 pages) with English Translation (11 pages).

International Search Report of corresponding PCT/JP2019/007736, dated Jun. 4, 2019, with English translation, 8 pages.

* cited by examiner

United States Patent US 11,482,016 B2

DIVISION LINE RECOGNITION APPARATUS

CROSS-REFERENCE TO RELATED APPLICATION(S)

This application is a U.S. National Phase Patent Application and claims priority to and the benefit of International Application Number PCT/JP2019/007736, filed on Feb. 28, 2019, which claims priority of Japanese Patent Application Number 2018-043554, filed on Mar. 9, 2018, the entire contents of all of which are incorporated herein by reference.

TECHNICAL FIELD

The present invention relates to an apparatus for recognizing division lines on roads.

BACKGROUND ART

Conventionally, there has been known a technology that recognizes division lines (white lines) on a road from a captured image(s) of the road and utilizes them for, for example, controlling vehicles. When a division line is recognized by directly using a luminance value of the captured image, feature points of edges sometimes appear not only at boundary portions of the division line, but also within the division line. So, there has been a problem of difficulty in determining which feature points indicate the boundary of the division line. Furthermore, when the luminance value of the division line decreases due to the influence of, for example, shadows of vehicles or the luminance value of a road surface rises due to a reflection of strong light on the road surface, there has also been a problem of difficulty in distinguishing between the division line and the road surface.

The following PTL 1 is known as a conventional technology to solve the above-described problems. PTL 1 describes a lane detection apparatus including: an imaging apparatus that captures images of an area in front of a vehicle including a road surface; and a lane mark detection unit that detects a lane mark formed on the road surface by executing binarization processing on an image captured by the imaging apparatus by using a binarization threshold value, wherein the lane mark detection unit: divides the captured image into a plurality of blocks which continue in a vertical direction and extend in a crosswise direction; sorts the plurality of blocks into bright part blocks with relatively high luminance values and dark part blocks with relatively low luminance values on the basis of the luminance values of the divided blocks; and executes the binarization processing on the captured image by changing the binarization threshold value for the bright part blocks and for the dark part blocks.

CITATION LIST

Patent Literature

PTL 1: Japanese Patent Application Laid-Open (Kokai) Publication No. 2016-206881

SUMMARY OF THE INVENTION

Problems to be Solved by the Invention

With the technology described in PTL 1, it is difficult to determine division lines appropriately under conditions where it is impossible to distinguish a luminance value of the division line from that of the road surface locally. Therefore, there is room for improvement of the accuracy in recognizing the division lines on the road.

Means to Solve the Problems

A division line recognition apparatus according to the present invention is an apparatus for recognizing a division line on a road from an image captured by a camera, wherein the division line recognition apparatus includes: a processing area setting unit configured to set a processing area to the image; a statistics calculation unit configured to calculate statistics of the image in the processing area; a threshold value setting unit configured to set a plurality of threshold values on the basis of the statistics; a division line feature point extraction unit configured to classify a plurality of pixels contained in the image on the basis of the plurality of threshold values to distinguish between the road surface and a white line and extracts feature points of the division line on the basis of classification results of the plurality of pixels; and a division line decision unit configured to decide the division line on the basis of the feature points extracted by the division line feature point extraction unit.

Advantageous Effects of the Invention

According to the present invention, accuracy in recognizing the division lines on the road can be improved.

DESCRIPTION OF EMBODIMENTS

First Embodiment

Figure 1:
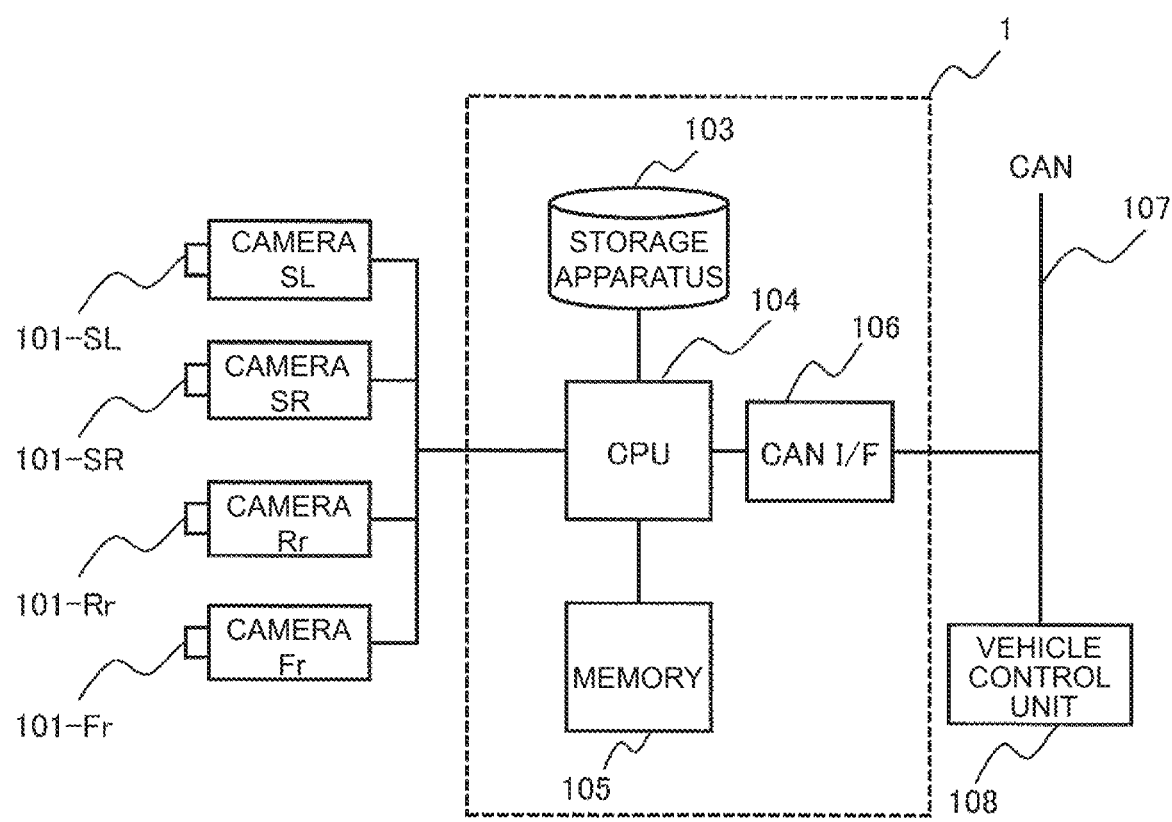
FIG. 1 is a diagram illustrating an example of a hardware configuration of a division line recognition apparatus according to one embodiment of the present invention.

FIG. 1 is a diagram illustrating an example of a hardware configuration of a division line recognition apparatus according to one embodiment of the present invention. A division line recognition apparatus 1 illustrated in FIG. 1: is designed to recognize division lines on a road from an image(s) captured by a camera as it is mounted in a vehicle and used; and includes a storage apparatus 103, a CPU 104, a memory 105, and a CAN I/F 106. The following cameras are coupled to the division line recognition apparatus 1: a front camera 101-Fr for monitoring an area in front of the vehicle; a rear camera 101-Rr for monitoring an area behind the vehicle; a left-side camera 101-SL for monitoring an area on the left side of the vehicle; a right-side camera 101-SR for monitoring an area on the right side of the vehicle. Furthermore, a vehicle control unit 108 is coupled to the division line recognition apparatus 1 via a CAN bus 107. Incidentally, in an example in FIG. 1, the above-described four cameras are coupled to the division line recognition apparatus 1; however, as images captured by each of an arbitrary number of cameras are input to the division line recognition apparatus 1, the division line recognition apparatus 1 can recognize the division line on the road from each image. Therefore, the following explanation will be provided by referring to one camera 101 without distinguishing the above-mentioned four cameras from each other.

The storage apparatus 103 stores various kinds of information and programs which are required for operations of the division line recognition apparatus 1. The CPU 104 executes a specified program stored in the storage apparatus 103 and thereby executes imaging processing by using an image(s) input from the camera 101 and recognizes a division line(s) on the road existing around the vehicle. The memory 105 is a volatile storage medium and is used as a work area by the CPU 104 when executing the imaging processing, and accumulates division line recognition results obtained by the imaging processing. Information of the division line recognition results accumulated in the memory 105 is output via the CAN I/F 106 to the CAN bus 107 and transmitted to the vehicle control unit 108. The vehicle control unit 108 performs various kinds of vehicle control according to a running state of the vehicle, for example, to control steering of the vehicle to prevent the vehicle from deviating from a driving lane by using the division line recognition results transmitted from the division line recognition apparatus 1.

Figure 2:
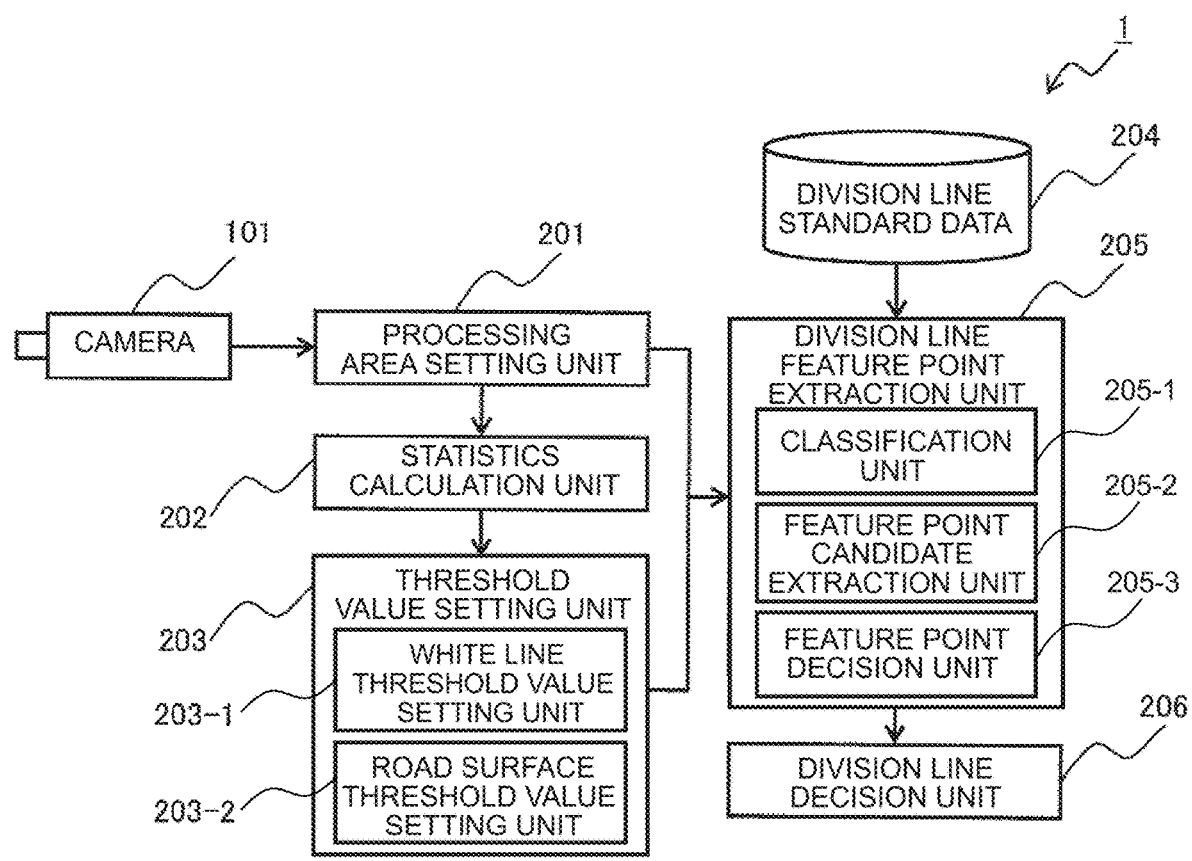
FIG. 2 is a diagram illustrating an example of a functional configuration of the division line recognition apparatus according to one embodiment of the present invention.

FIG. 2 is a diagram illustrating an example of a functional configuration of the division line recognition apparatus according to one embodiment of the present invention. The division line recognition apparatus 1 illustrated in FIG. 2 functionally includes a processing area setting unit 201, a statistics calculation unit 202, a threshold value setting unit 203, a division line feature point extraction unit 205, and a division line decision unit 206. The threshold value setting unit 203 is configured of a white line threshold value setting unit 203-1 and a road surface threshold value setting unit 203-2. The division line feature point extraction unit 205 is configured of a classification unit 205-1, a feature point candidate extraction unit 205-2, and a feature point decision unit 205-3. The division line recognition apparatus 1 implements each of these functional blocks by having the CPU 104 execute a specified program.

Images captured by the camera 101 are transmitted at specified time intervals to the processing area setting unit 201. Each of the images which are input at specified time intervals may hereinafter sometimes be referred to as a "frame." The processing area setting unit 201 sets a processing area to an image which has been input from the camera 101. The processing area which is set here means an image area used to extract a division line (or white line) on the road from the image. Therefore, the processing area is set around a place where it is assumed that a white line exists; and if the white line was recognized in a previous frame, the processing area can be set with reference to that position. For example, in a case of the right-side camera 101-SR or the left-side camera 101-SL, the processing area can be set by setting a predefined margin above and under the white-line-recognized position in the previous frame. If the processing area is not detected in the previous frame, a predefined area may be used. The purpose of setting the processing area in the image is to shorten processing time by narrowing down the area on which the processing is to be executed because it takes time to process the entire image if the processing capacity of the CPU 104 is not sufficient.

However, if the processing capacity of the CPU 104 is sufficient, the entire image may be set as the processing area. Incidentally, the following explanation will be provided by assuming that a division line is a white line; however, the same applies to a division line other than the white line.

The processing area setting unit 201 sets the processing area in a current frame on the basis of, for example, the position of a white line in a previous frame, that is, the position of the white line recognized from the image which was a processing object last time. Incidentally, if the white line was not successfully recognized in the previous frame, the processing area may be set on the basis of the position of a white line in a further preceding frame or a default processing area may be set to a predetermined position. Accordingly, it is possible to prevent lengthening of the processing time due to a failure to set the processing area. Furthermore, if the white line is a broken line, the processing area can be set on the basis of the position of the white line in a frame where the white line was recognized last time.

The statistics calculation unit 202 calculates the statistics of the image in the processing area which is set by the processing area setting unit 201. Specifically speaking, for example, an average value and a standard deviation of the luminance value of each pixel of the image in the processing area are calculated as the statistics.

The threshold value setting unit 203 causes the white line threshold value setting unit 203-1 and the road surface threshold value setting unit 203-2 to set a white line threshold value and a road surface threshold value, respectively, on the basis of the statistics of the image, which are found by the statistics calculation unit 202, that is, the average value and the standard deviation of the luminance value of each pixel in the processing area. The white line threshold value is a threshold value for recognizing a white line part from the image in the processing area and corresponds to a minimum luminance value of a pixel belonging to the white line. Specifically, a pixel having the luminance value which is equal to or larger than the white line threshold value is extracted as a white line candidate. Furthermore, the road surface threshold value is a threshold value for recognizing a road surface part from the image in the processing area and corresponds to a maximum luminance value of a pixel belonging to the road surface other than the white line. Specifically, a pixel having the luminance value which is equal to or smaller than the road surface threshold value is extracted as the road surface candidate. Incidentally, in the following explanation, parts other than the white line on the road will be collectively referred to as the "road surface." A specific method of setting the white line threshold value and the road surface threshold value will be explained later.

The division line feature point extraction unit 205 causes the classification unit 205-1, the feature point candidate extraction unit 205-2, and the feature point decision unit 205-3 to extract feature points of the white line from the image on the basis of the white line threshold value and the road surface threshold value which are set by the threshold value setting unit 203. The classification unit 205-1 classifies each pixel contained in the image within the processing area into any one of the "road surface," the "white line," and "indefinite" by using the white line threshold value and the road surface threshold value. Specifically, when the luminance value of each pixel is compared with the white line threshold value and the road surface threshold value and whether the relevant pixel belongs to either the "white line" or the "road surface" is judged and if it is determined that the relevant pixel belongs neither of them, the relevant pixel is classified as "indefinite." Incidentally, a well-known edge extraction method such as a differential filter like a Sobel filter may be used to extract white line edges from the image within the processing area and the classification unit 205-1 may set pixels existing around such white line edges as objects and classify each of the pixels. In this case, pixels which are not classified will be excluded from objects of subsequent processing.

The feature point candidate extraction unit 205-2 extracts feature point candidates which are candidates for feature points indicating the outline of the white line on the basis of the classification results of the respective pixels by the classification unit 205-1. Specifically speaking, the feature point candidate extraction unit 205-2: finds a boundary at which the classification of the pixels changes; and extracts points corresponding to that boundary as the feature point candidates.

The feature point decision unit 205-3 decides the feature points from the feature point candidates on the basis of the positional relationship between the plurality of feature point candidates extracted by the feature point candidate extraction unit 205-2. Specifically speaking, the feature point decision unit 205-3 determines which combination of the feature point candidates would be certain as the outline of the white line by referring to division line standard data 204 stored in the storage apparatus 103 and checking the distance between the plurality of extracted feature point candidates against the division line standard data 204. Incidentally, the division line standard data 204: is a database which stores standard values such as the width and length of the white line; and is stored in advance in the storage apparatus 103.

The division line decision unit 206 recognizes the white line drawn on the road on the basis of the feature points extracted by the division line feature point extraction unit 205 and determines the position of the white line in the image. For example, the division line decision unit 206 performs coordinate transformation of all the feature points within the processing area into a specified coordinate system, in which distortion of the image is corrected, and then recognizes the white line by using a method of, for example, trimetric projection. Specifically speaking, while changing an angle of the coordinate axis by a certain width, each feature point which has been coordinate-transformed is projected onto the x-coordinate axis and the y-coordinate axis, respectively, and accumulated values of edge intensity are aggregated. Then, the white line can be recognized by finding the angle and position which make the edge intensity maximum. Incidentally, since the coordinate transformation of the feature points requires camera parameters such as the angle of view and an image capturing direction of the camera 101, it is desirable that the camera parameters for the coordinate transformation should be stored in, for example, the storage apparatus 103 in advance. When the white line is recognized in this way, the division line decision unit 206 may judge the type of a traffic sign represented by the white line by identifying whether the white line is a solid line or a broken line.

Figure 3:
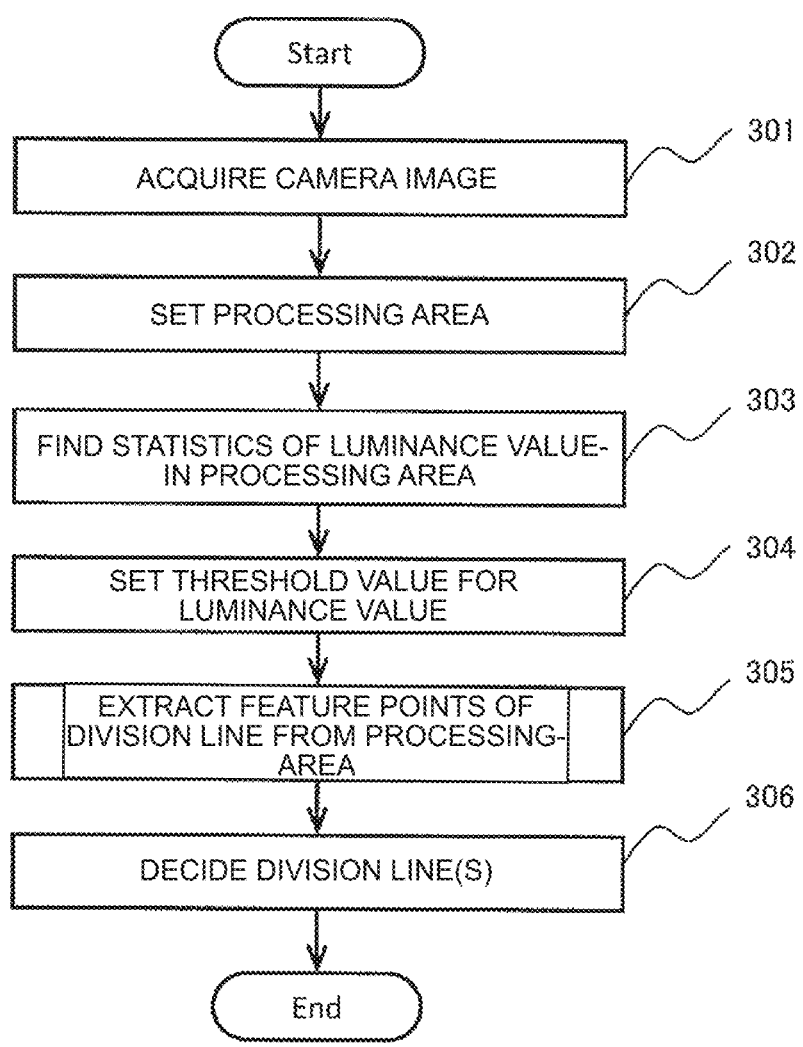
FIG. 3 is a diagram illustrating a processing flow of a division line recognition apparatus according to a first embodiment of the present invention.

Next, a processing flow of the division line recognition apparatus 1 will be explained. FIG. 3 is a diagram illustrating a processing flow of the division line recognition apparatus according to a first embodiment of the present invention. The processing flow in FIG. 3 illustrates the processing of one-frame image. Specifically, with the division line recognition apparatus 1 according to this embodiment, the CPU 104 executes processing for recognizing a division line from an image in accordance with the processing flow in FIG. 3 every time the image is input from the camera 101 at a specified frame rate.

In step 301, a camera image, that is, an image which is input from the camera 101 is acquired.

In step 302, the processing area setting unit 201 is caused to set the processing area in the image acquired in step 301. Under this circumstance, the position of the processing area within the image is decided on the basis of, for example, the position of the white line in the previous frame as described earlier.

In step 303, the statistics calculation unit 202 is caused to find the statistics of the luminance value in the processing area which was set in step 302. Under this circumstance, the average value and the standard deviation of the luminance value of each pixel in the processing area are calculated as the statistics of the image as described earlier.

In step 304, the threshold value setting unit 203 is caused to set threshold values for the luminance value on the basis of the statistics found in step 303. Under this circumstance, the white line threshold value setting unit 203-1 is caused to set the white line threshold value and the road surface threshold value setting unit 203-2 is caused to set the road surface threshold value as described earlier. Incidentally, the details of a method for setting the threshold values in step 304 will be explained later with reference to FIG. 4 and FIG. 16.

In step 305, the division line feature point extraction unit 205 is caused to extract feature points of the division line, that is, the white line from the image within the processing area, which was set in step 302, on the basis of the threshold values set in step 304. Incidentally, the details of a method for extracting the feature points in step 305 will be explained later with reference to FIG. 5 to FIG. 9.

In step 306, the division line decision unit 206 is caused to decide the division line (the white line) on the road from the feature points extracted in step 305. After executing step 306, the CPU 104 terminates the processing flow in FIG. 3.

Figure 4:
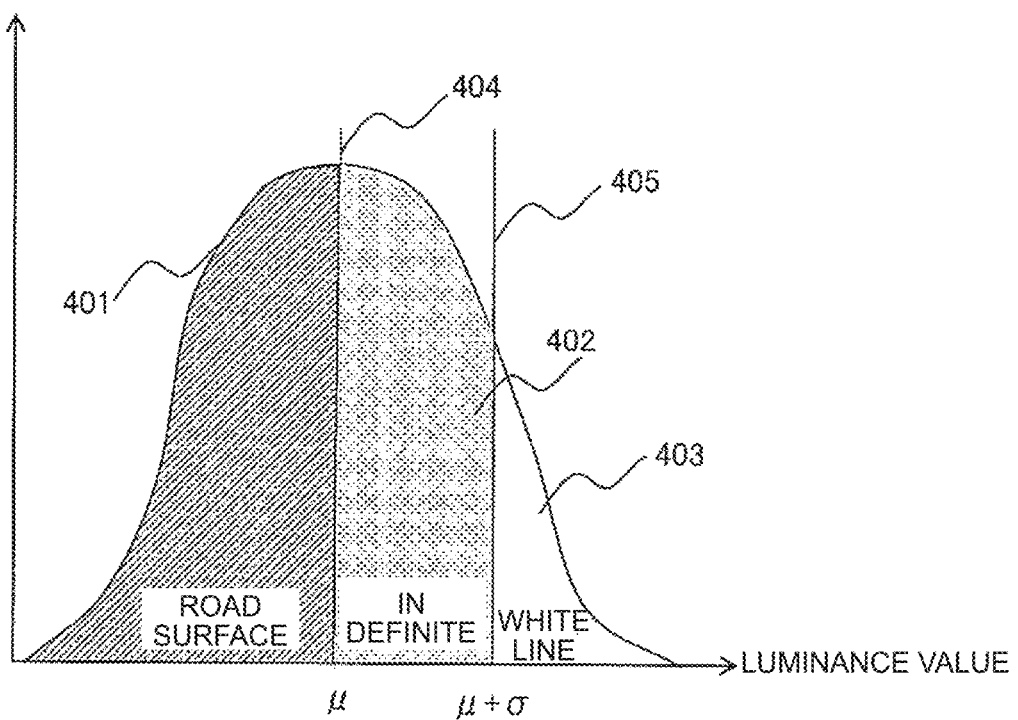
FIG. 4 is a diagram illustrating an example of a threshold value setting method by a threshold value setting unit.

Next, the details of the method for setting the threshold values in step 304 will be explained. FIG. 4 is a diagram illustrating an example of the threshold value setting method by the threshold value setting unit 203.

Let us assume that an average value p and a standard deviation a are calculated as the statistics of the luminance value of each pixel in the processing area by the statistics calculation unit 202. In this case, the road surface threshold value setting unit 203-2 sets, for example, the average value p as a road surface threshold value 404 as illustrated in FIG. 4. Accordingly, the division line feature point extraction unit 205 is caused to classify each pixel contained in an area 401 of a smaller luminance value than the road surface threshold value 404 into the "road surface." On the other hand, the white line threshold value setting unit 203-1 sets, for example, p+Q which is obtained by adding the standard deviation a to the average value p, as a white line threshold value 405 as illustrated in FIG. 4. Accordingly, the division line feature point extraction unit 205 is caused to classify each pixel contained in an area 403 of a larger luminance value than the white line threshold value 405 into the "white line." Incidentally, a pixel which is not classified into either the "road surface" or the "white line," that is, each pixel contained in an area 402 corresponding to the luminance value which is equal to or larger than the road surface threshold value 404 and equal to and smaller than the white line threshold value 405 is classified into "indefinite" by the division line feature point extraction unit 205.

The method in FIG. 4 is established on the premise that the luminance value is conformable to normal distribution; however, it may possibly not be true in many cases. In such cases, it is effective to use the statistics such as a median value or a median absolute deviation which may hardly be affected by any bias in distribution even if there is such bias in distribution.

Figure 16:
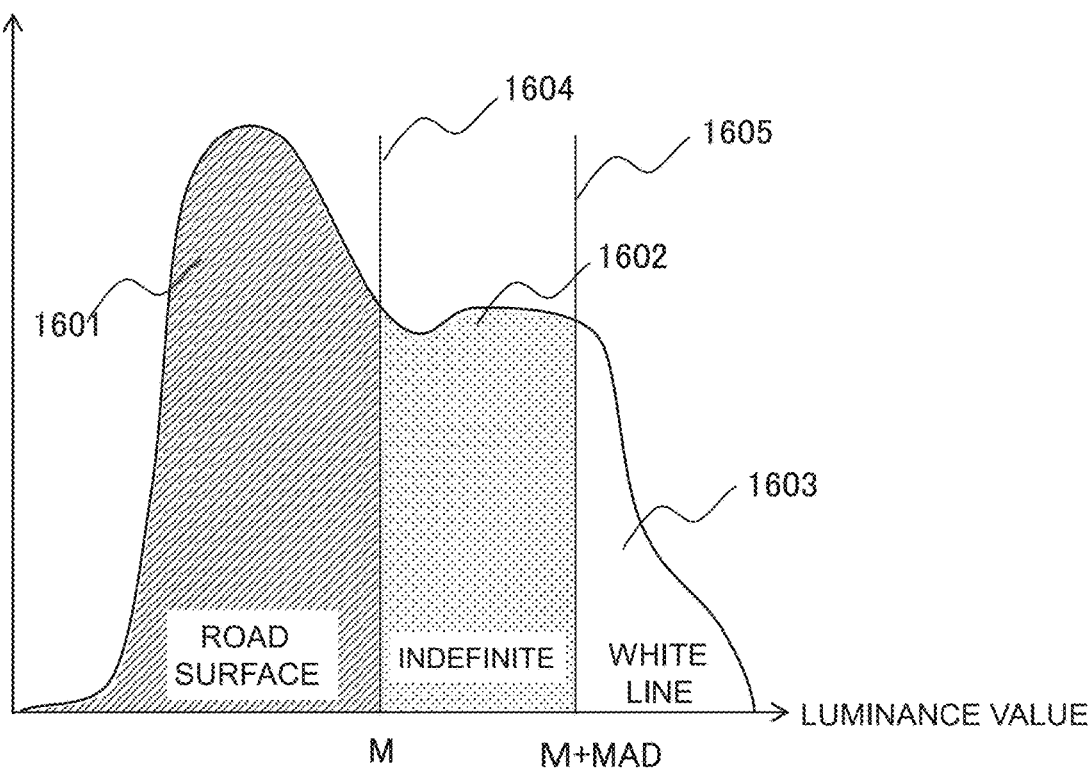
FIG. 16 is a diagram illustrating an example of a threshold value setting method by a threshold value setting unit.

FIG. 16 is a diagram illustrating another example of the threshold value setting method by the threshold value setting unit 203. Let us assume that a median value M and a median absolute deviation MAD are calculated as the statistics for the luminance value of each pixel in the processing area by the statistics calculation unit 202. In this case, the road surface threshold value setting unit 203-2 sets, for example, the median value M as a road surface threshold value 1604 as illustrated in FIG. 16. Accordingly, the division line feature point extraction unit 205 is caused to classify each pixel contained in an area 1601 of a smaller luminance value than the road surface threshold value 1604 into the "road surface." On the other hand, the white line threshold value setting unit 203-1 sets, for example, M+MAD which is obtained by adding the median absolute deviation MAD to the median value M, as a white line threshold value 1605 as illustrated in FIG. 16. Accordingly, the division line feature point extraction unit 205 is caused to classify each pixel contained in an area 1603 of a larger luminance value than the white line threshold value 1605 into the "white line." Incidentally, a pixel which is not classified into either the "road surface" or the "white line," that is, each pixel contained in an area 1602 corresponding to the luminance value which is equal to or larger than the road surface threshold value 1604 and equal to and smaller than the white line threshold value 1605 is classified into "indefinite" by the division line feature point extraction unit 205.

By setting the white line threshold value and the road surface threshold value, respectively, as described above, each pixel whose luminance value is relatively high in the processing area can be extracted as the white line candidate. Furthermore, by using the statistics, even if brightness of the frame changes due to any change in the surrounding environment of the vehicle, it is possible to set the white line threshold value and the road surface threshold value and extract the white line candidates without being impacted by the above-described change. Incidentally, the method for setting the white line threshold value and the road surface threshold value is not limited to those methods described above. Any arbitrary method can be used as long as the white line threshold value and the road surface threshold value can be set respectively appropriately on the basis of the statistics of the luminance value of each pixel in the processing area.

Figure 17:
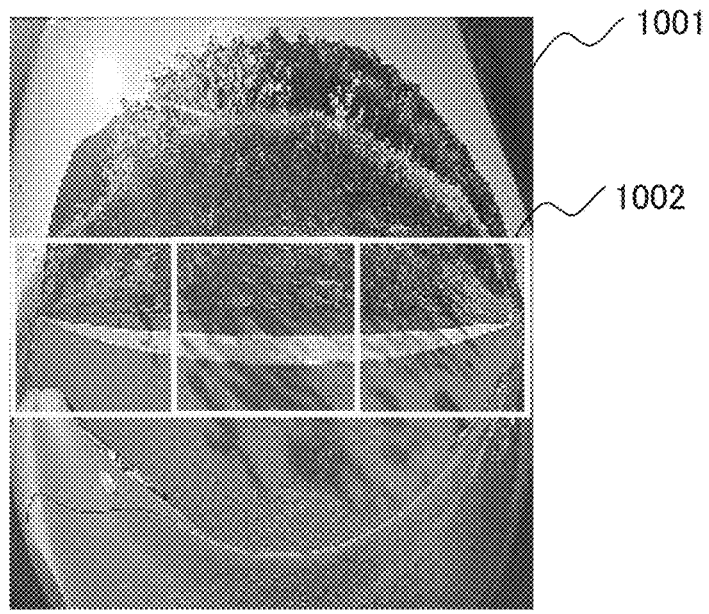
FIG. 17 is a diagram illustrating an example of an image before classification.

Furthermore, the road surface threshold value 404 and the white line threshold value 405 can be set by dividing the processing area into an appropriate number of areas and finding the statistics for each of the divided areas instead of finding the statics by targeting the entire processing area. For example, more appropriate threshold values can be set by dividing the processing into three areas as illustrated in FIG. 17 and setting the statistics and the threshold values for each of the divided areas.

Figure 5:
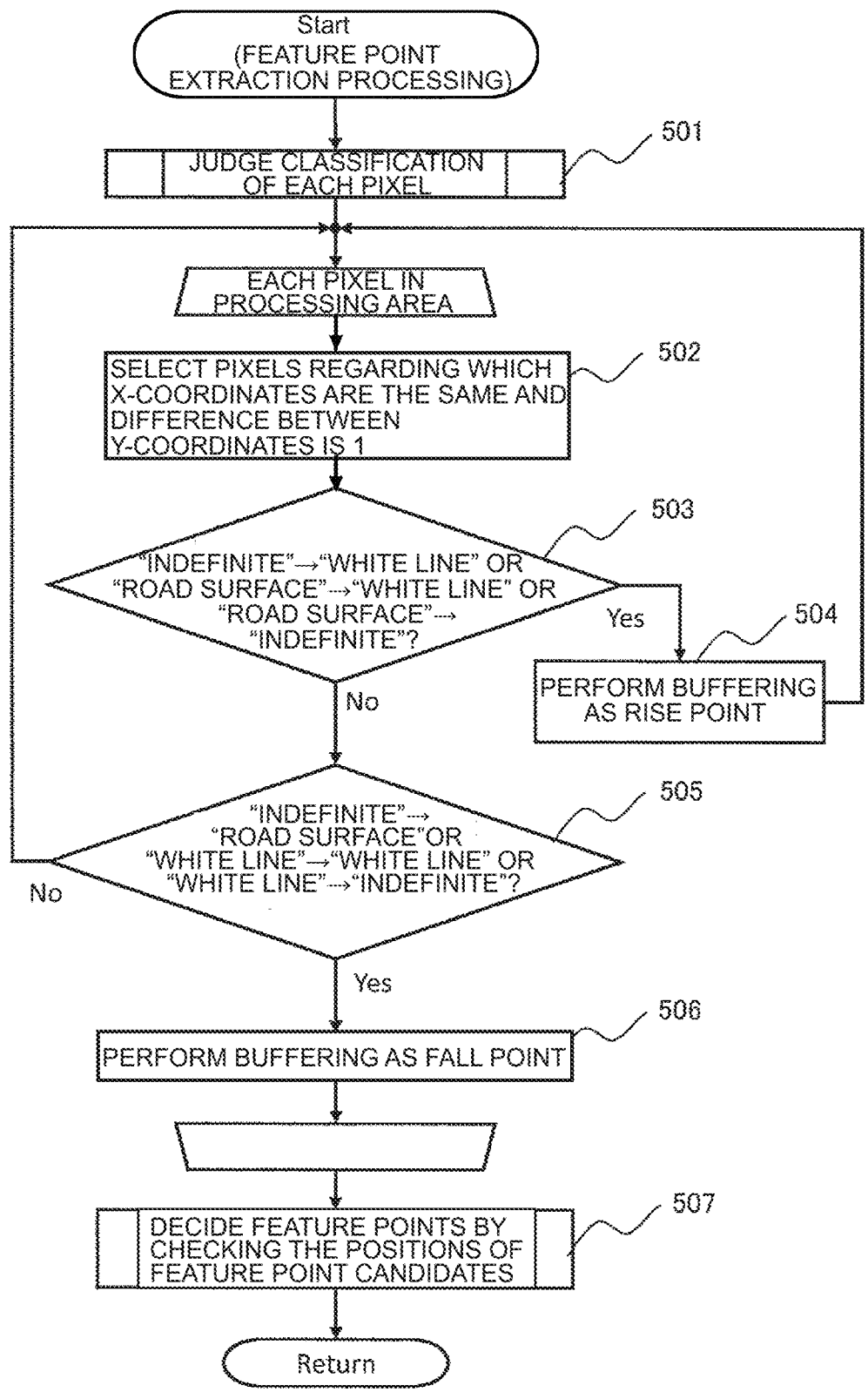
FIG. 5 is a diagram illustrating a processing flow of a division line feature point extraction unit.

Next, the details of the feature point extraction method in step 305 in FIG. 3 will be explained. FIG. 5 is a diagram illustrating a processing flow of the division line feature point extraction unit 205 in step 305.

In step 501, the classification unit 205-1 is caused to judge the classification of each pixel in the processing area. Under this circumstance, as the classification unit 205-1 executes the classification processing illustrated in the processing flow in FIG. 6, each pixel in the processing area is classified as any one of the "road surface," the "white line," and "indefinite." Incidentally, the details of the processing flow in FIG. 6 will be explained later.

In steps 502 to 506, the feature point candidate extraction unit 205-2 is caused to execute the following processing with respect to each pixel in the processing area by using the classification results of step 501. Under this circumstance, the X-axis is defined as a left-to-right direction of the image and the Y-axis is defined as an up-to-down direction.

In step 502, regarding pixels which are processing objects, a pair of pixels regarding which their x-coordinates are the same and the difference between their y-coordinates is 1 is selected. Incidentally, this is a case where the camera 101 is the left-side camera 101-SL or the right-side camera 101-SR. On the other hand, if the camera 101 is the front camera 101-Fr or the rear camera 101-Rr, an extending direction of the division line in the image changes by approximately 90 degrees; and, therefore, it is desirable that a pair of pixels regarding which their y-coordinates are the same and the difference between their x-coordinates is 1 should be selected. Accordingly, processing similar to that of the case of the left-side camera 101-SL or the right-side camera 101-SR can be executed.

In step 503, the classification results in step 501 are compared with each other regarding the pair of pixels selected in step 502. As a result, when scanning is performed in a direction so that the x-coordinate stays the same and the y-coordinate increases, and if the classification of the pixels changes from "indefinite" to the "white line" or from the "road surface" to the "white line," or from the "road surface" to "indefinite," one of the pixels, for example, the pixel whose y-coordinate value is larger is recognized as a rise point and is buffered in step 504. Incidentally, the rise point: is a point where the luminance value changes in an increasing direction; and corresponds to a feature point candidate indicating the outline of the white line. After the relevant pixel is buffered as the rise point, the processing returns to step 502 and proceeds to the processing of the next pixel. On the other hand, if the above-described condition is not satisfied, the processing proceeds to step 505.

In step 505, the classification results in step 502 are compared with each other with respect to the pair of pixels selected in step 502 in a manner similar to step 503. As a result, when scanning is performed in a direction so that the x-coordinate stays the same and the y-coordinate increases, and if the classification of the pixels changes from "indefinite" to the "road surface," or from the "white line" to the "road surface," or from the "white line" to "indefinite," one of the pixels, for example, the pixel whose y-coordinate value is larger is recognized as a fall point and is buffered in step 506. Incidentally, the fall point: is a point where the luminance value changes in a decreasing direction; and corresponds to a feature point candidate indicating the outline of the white line. After the relevant pixel is buffered as the fall point, the processing returns to step 502 and proceeds to the processing of the next pixel. On the other hand, if the above-described condition is not satisfied, the processing proceeds to step 502 without doing anything and then proceeds to the processing of the next pixel.

In steps 502 to 506, whether the relevant pixel is the rise point or the fall point, which is the feature point candidate, or whether the relevant pixel is neither the rise point nor the fall point is judged with respect to all the pixels in the processing area by executing the above-described processing on each pixel in the processing area. After executing the processing in steps 502 to 506 with respect to all the pixels in the processing area, the processing proceeds to step 507.

In step 507, the feature point decision unit 205-3 is caused to check the positions of the respective feature point candidates judged in steps 502 to 506, that is, the positions of the rise point and the fall point and decide the feature points. Under this circumstance, as the feature point decision unit 205-3 executes the feature point decision processing illustrated in the processing flow in FIG. 7, the feature points are decided from the feature point candidates on the basis of the positional relationship between the plurality of feature point candidates extracted from the image in the processing area. Incidentally, the details of the processing flow in FIG. 7 will be explained later. After executing the processing in step 507, the processing in step 305 in FIG. 3 is terminated and proceeds to the next step 306.

Figure 6:
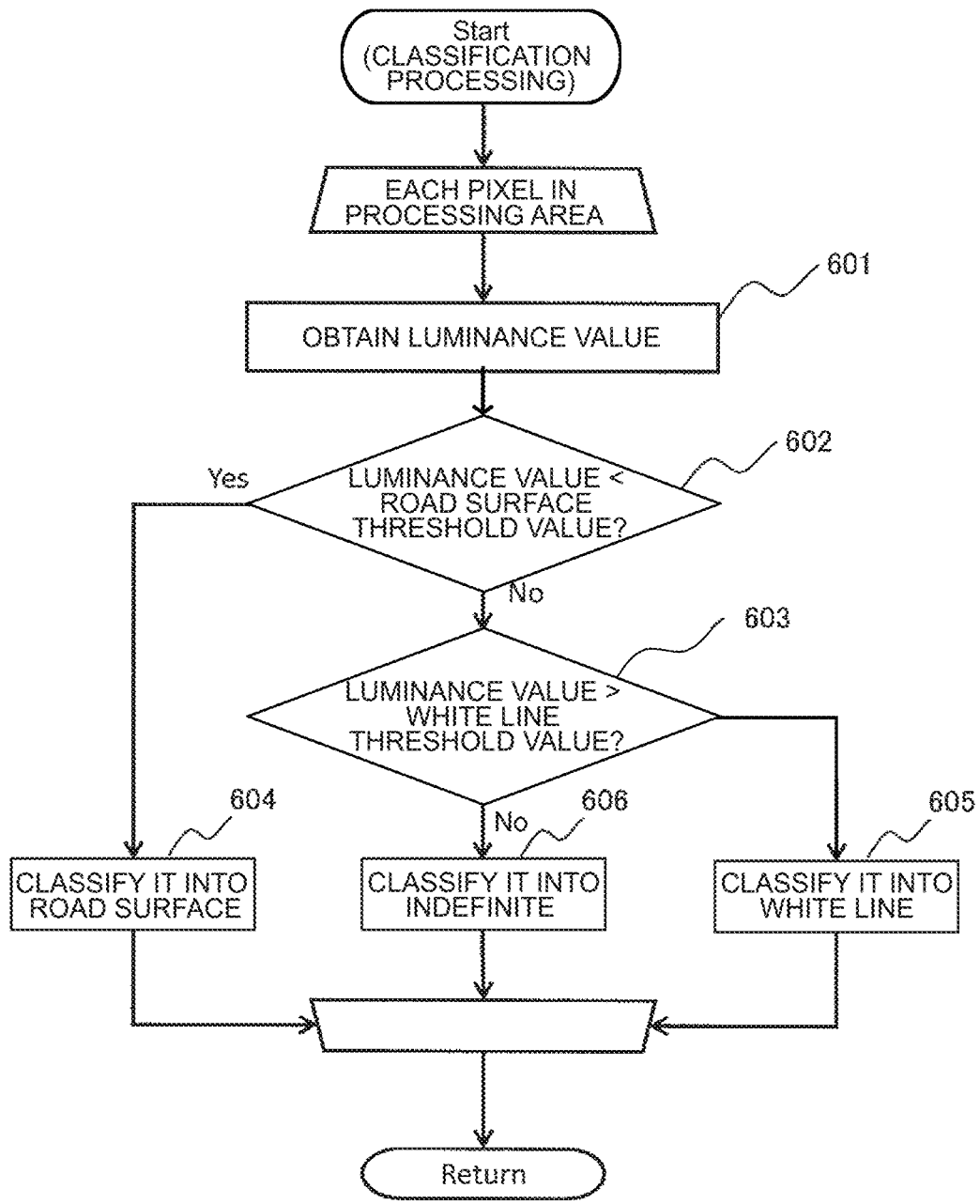
FIG. 6 is a diagram illustrating a processing flow of a classification unit.

FIG. 6 is a diagram illustrating the processing flow of the classification unit 205-1 in step 501 in FIG. 5. The classification unit 205-1 executes processing in each of steps 601 to 606 explained below with respect to each pixel in the processing area.

In step 601, the luminance value of a pixel which is the processing object in the image is acquired.

In step 602, the luminance value acquired in step 601 is compared with the road surface threshold value which is set by the road surface threshold value setting unit 203-2 in step 304 in FIG. 3. As a result, if the luminance value is smaller than the road surface threshold value, the relevant pixel is classified as the "road surface" in step 604 and the processing proceeds to the next pixel. On the other hand, if the luminance value is equal to or larger than the road surface threshold value, the processing proceeds to step 603.

In step 603, the luminance value acquired in step 601 is compared with the white line threshold value which is set by the white line threshold value setting unit 203-1 in step 304 in FIG. 3. As a result, if the luminance value is larger than the white line threshold value, the relevant pixel is classified as the "white line" in step 605 and the processing proceeds to the processing of the next pixel. On the other hand, if the luminance value is equal to or smaller than the white line threshold value, the relevant pixel is classified as "indefinite" in step 606 and the processing proceeds to the processing of the next pixel.

In steps 601 to 606, all the pixels in the processing area are classified into any one of the "road surface," the "white line," and "indefinite" by executing the above-described processing on each pixel in the processing area. After executing the processing in steps 601 to 606 with respect to all the pixels in the processing area, the processing in step 501 in FIG. 5 is terminated and proceeds to the next step 502.

Figure 7:
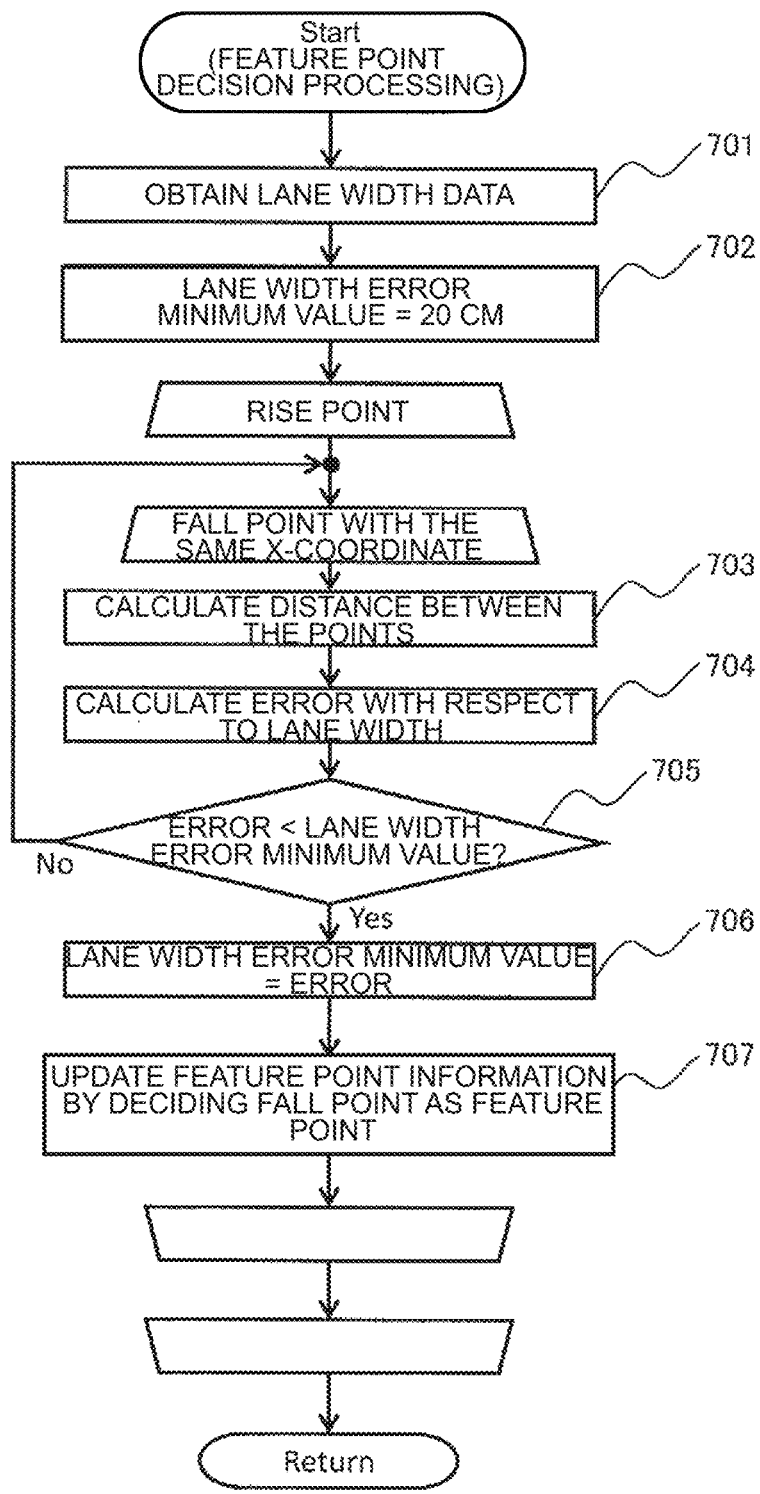
FIG. 7 is a diagram illustrating a processing flow of a feature point decision unit.

FIG. 7 is a diagram illustrating the processing flow of the feature point decision unit 205-3 in step 507 in FIG. 5.

In step 701, lane width data, that is, data representing the width of the white line is acquired from the storage apparatus 103. Under this circumstance, for example, the lane width data which is stored as part of the division line standard data 204 in the storage apparatus 103 is acquired. When this happens, the type of the road where the vehicle is currently driving may be acquired from, for example, a navigation apparatus which is not illustrated in the drawing and is coupled to the division line recognition apparatus 1 via the CAN bus 107; and the lane width data corresponding to that road type may be searched and acquired from the division line standard data 204. Incidentally, if the division line recognition apparatus 1 also serves as the navigation apparatus, the lane width data corresponding to the type of the road where the vehicle is driving can be acquired in the same manner as described above.

In step 702, an initial value of a lane width error minimum value is set. The lane width error minimum value: is used in the subsequent processing to judge whether the positional relationship between the rise point and the fall point is certain as feature points or not; is stored in the memory 105; and is updated according to the processing status from time to time. Under this circumstance, for example, 20 cm is set as the initial value of the lane width error minimum value. However, 20 cm is one example; and any arbitrary numerical value which is equal to or wider than the width of an actual white line can be set as the initial value of the lane width error minimum value.

In steps 703 to 707, the following processing is executed on each of the feature point candidates extracted from the image in the processing area by the feature point candidate extraction unit 205-2 in steps 502 to 506 in FIG. 5, that is, on each of the rise points and the fall points which are buffered in steps 504, 506.

In step 703, regarding the rise point which is the processing object and the fall point whose x-coordinate is the same as that of the above-mentioned rise point, the distance between these points is calculated. Specifically, a pair of the rise point and the fall point regarding which their x-coordinates are the same and the difference between their y-coordinates is 1 is selected from the plurality of feature point candidates extracted from the image in the processing area and the distance between them according their positional relationship is found.

In step 704, the distance found in step 703 is compared with the width of the white line represented by the lane width data acquired in step 701, an error (difference) between them is calculated.

In step 705, the error found in step 704 is compared with the current lane width error minimum value. As a result, if the error is smaller than the lane width error minimum value, the lane width error minimum value is replaced with the relevant error in step 706 and then feature point information is updated in step 707 by deciding the relevant fall point as a feature point. Incidentally, the feature point information is information indicating the feature point decided by the feature point decision unit 205-3 and is recorded so that the x-coordinates do not overlap in the feature point buffer provided in the memory 105. Specifically, even if a plurality of fall points whose x-coordinates are the same exist, only one fall point at a maximum is recorded as the feature point in the feature point information.

However, if the condition in step 705 is not satisfied with respect to any one of the fall points, it is considered that no feature point corresponding to the relevant x-coordinate exists; and no feature point is recorded in the feature point information. After updating the feature point information in step 707, the processing returns to step 703 and proceeds to the processing on the next combination of a rise point and a fall point. On the other hand, if it is determined in step 705 that the error is equal to and larger than the lane width error minimum value, the processing returns to step 502 without doing anything, and then proceeds to the processing on the next combination of a rise point and a fall point.

In steps 703 to 707, the positional relationship between the feature point candidates is checked against each other with respect to all the feature point candidates extracted from the processing area and their consistency as the outline of the white line is checked by executing the above-described processing on each combination of the rise point and the fall point. As a result, the feature points can be decided from the feature point candidates by identifying a combination of the rise point and the fall point, which is closest to the width of the white line in the processing area, with respect to each x-coordinate and retaining information of that fall point as the feature point information. Incidentally, in the example in FIG. 7, the fall point is recorded as the feature point information; however, the rise point may be recorded as the feature point information or both the rise point and the fall point may be recorded as the feature point information. After executing the processing in steps 703 to 707 with respect to all the rise points and the fall points which are extracted in the processing area, the processing in step 507 in FIG. 5 is terminated and the processing flow of the division line feature point extraction unit 205 is completed.

Figure 8:
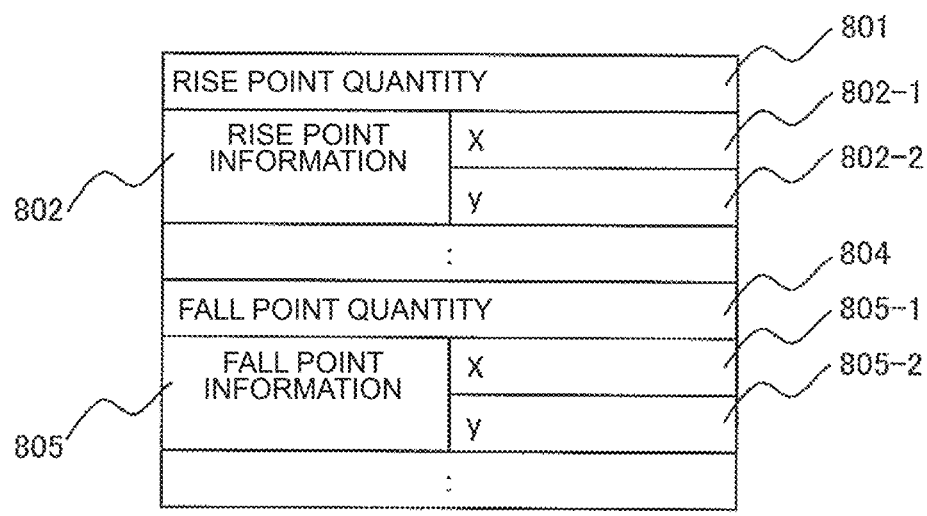
FIG. 8 is a diagram illustrating an example of a data structure of a feature point candidate buffer.

FIG. 8 is a diagram illustrating an example of a data structure of a feature point candidate buffer which is used when buffering each of the rise points and the fall points in steps 504 and 506 in FIG. 5. The feature point candidate buffer illustrated in FIG. 8 is implemented by using the memory 105 and stores each piece of data of a rise point quantity 801, rise point information 802, a fall point quantity 804, and fall point information 805. The rise point quantity 801 is data indicating the quantity of the rise points and is equivalent to the data quantity of the rise point information 802. Specifically, the same quantity of the rise point information 802 as the quantity indicated by the rise point quantity 801 is stored in the feature point candidate buffer. The rise point information 802 is data indicating the position of the rise point in the image and is composed of an x-coordinate 802-1 and a y-coordinate 802-2 which represent an x-coordinate value and a y-coordinate value, respectively, of the rise point in the image coordinate system. Similarly regarding the fall point, the fall point quantity 804 is data indicating the quantity of the fall points and is equivalent to the data quantity of the fall point information 805. Specifically, the same quantity of the fall point information 805 as the quantity indicated by the fall point quantity 804 is stored in the feature point candidate buffer. The fall point information 805 is data indicating the position of the fall point in the image and is composed of an x-coordinate 805-1 and a y-coordinate 805-2 which represent an x-coordinate value and a y-coordinate value, respectively, of the fall point in the image coordinate system.

Figure 9:
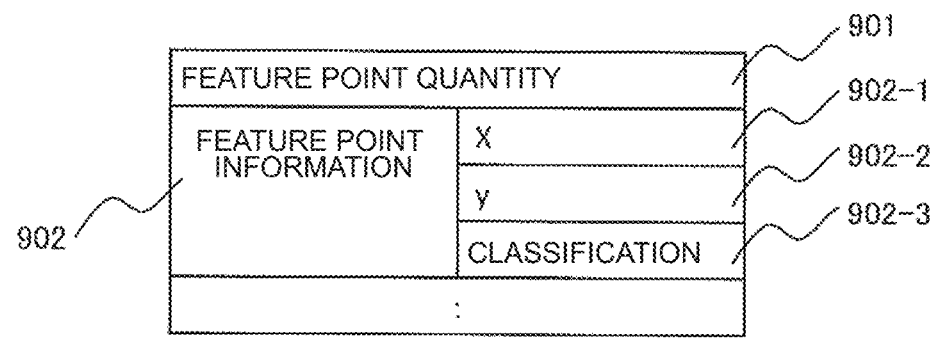
FIG. 9 is a diagram illustrating an example of a data structure of a feature point buffer.

FIG. 9 is a diagram illustrating an example of a data structure of a feature point buffer which is used when buffering the feature point information in step 707 in FIG. 7. The feature point buffer illustrated in FIG. 9 is implemented by using the memory 105 and stores each piece of data of a feature point quantity 901 and feature point information 902. The feature point quantity 901 is data indicating the quantity of the feature points and is equivalent to the data quantity of the feature point information 902. Specifically, the same quantity of the feature point information 902 as the quantity indicated by the feature point quantity 901 is stored in the feature point buffer. The feature point information 902 is data indicating the position and classification of the feature point in the image and is composed of an x-coordinate 902-1 and a y-coordinate 902-2 which represent an x-coordinate value and a y-coordinate value, respectively, of the feature point in the image coordinate system, and classification 902-3.

Next, a specific example of the above-described processing will be explained with reference to FIG. 10 to FIG. 14. Incidentally, in the following explanation, an explanation will be provided about a specific example of a case where the processing is executed on an image, as an object, which is captured by the right-side camera 101-SR; however, the same applies to images captured by other cameras.

Figure 10:
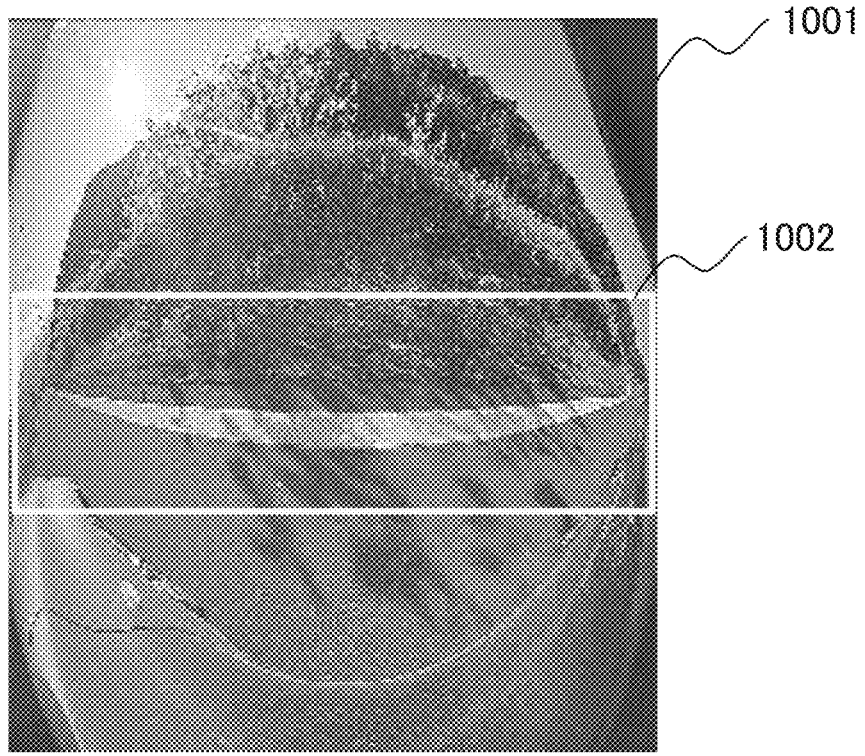
FIG. 10 is a diagram illustrating an example of an image before classification.

FIG. 10 is a diagram illustrating an example of an image before classification. The processing area setting unit 201 sets a processing area 1002 to an image 1001 input from the camera 101, for example, within the range surrounded by a white frame in the drawing. A white line which is the object to be recognized is included in the processing area 1002 and shadows of the grass are partly over the white line. Incidentally, the processing area 1002 is determined, for example, on the basis of the position of the white line in the previous frame as explained earlier.

The statistics calculation unit 202 calculates the statistics of the luminance value of each pixel within the processing area 1002 which is set to the image 1001. The threshold value setting unit 203 sets the white line threshold value and the road surface threshold value on the basis of the statistics calculated by the statistics calculation unit 202. The classification unit 205-1 classifies each pixel of the image 1001 into any one of the "road surface," the "white line," and "indefinite" by using the white line threshold value and the road surface threshold value which are set by the threshold value setting unit 203.

Figure 11:
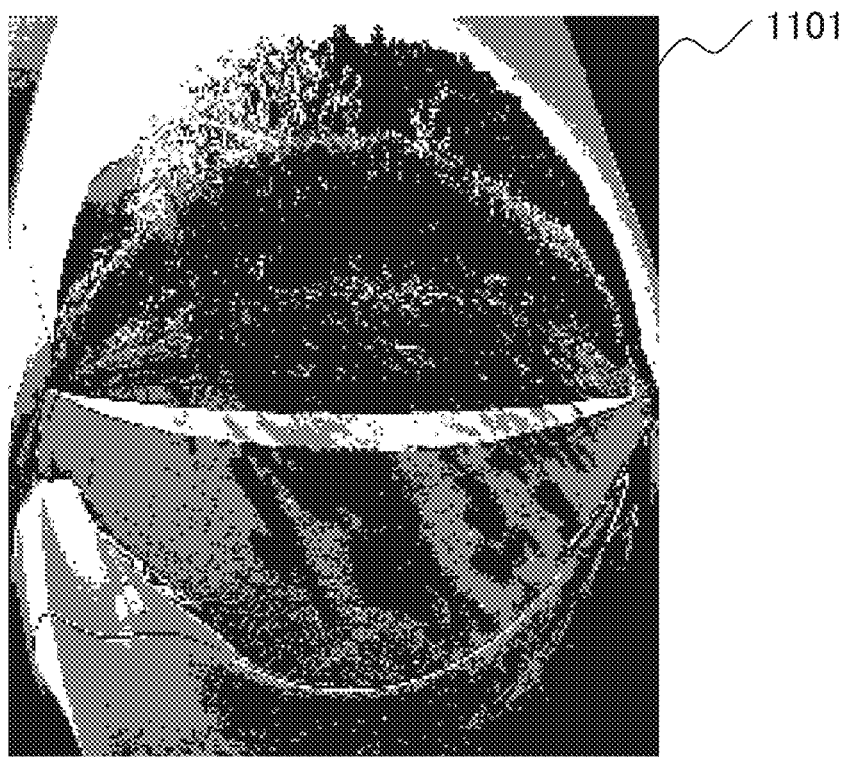
FIG. 11 is a diagram illustrating an example of a classified image.

FIG. 11 is a diagram illustrating an example of a classified image 1101 obtained by classifying each pixel of the image 1001 in FIG. 10. With the classified image 1101, the classification results of the respective pixels are indicated as the following three types: black, white, and gray. The black corresponds to the classification result of the "road surface," the white corresponds to the classification result of the "white line," and the gray corresponds to the classification result of "indefinite," respectively. Under this circumstance, it can be seen that regarding the respective pixels corresponding to the white line in the image 1001 in FIG. 10, most of such pixels are classified as the "white line" in the classified image 1101 in FIG. 11, but some pixels are partly classified as "indefinite" because the shadows of the grass are laid over them. Furthermore, it can be seen that regarding the respective pixels corresponding to the road surface in the image 1001 in FIG. 10, many parts of such pixels are classified as "indefinite" in the classified image 1101 in FIG. 11. Incidentally, the classification results of the entire area of the image 1001 are indicated as the classified image 1101 for the purpose of easy comprehension in FIG. 11; however, practically, only the pixels in the processing area 1002 may be classified as explained earlier.

The feature point candidate extraction unit 205-2 extracts the rise points and the fall points which are the feature point candidates from the classified image 1101 on the basis of the classification results of the respective pixels indicated in the classified image 1101.

Figure 12:
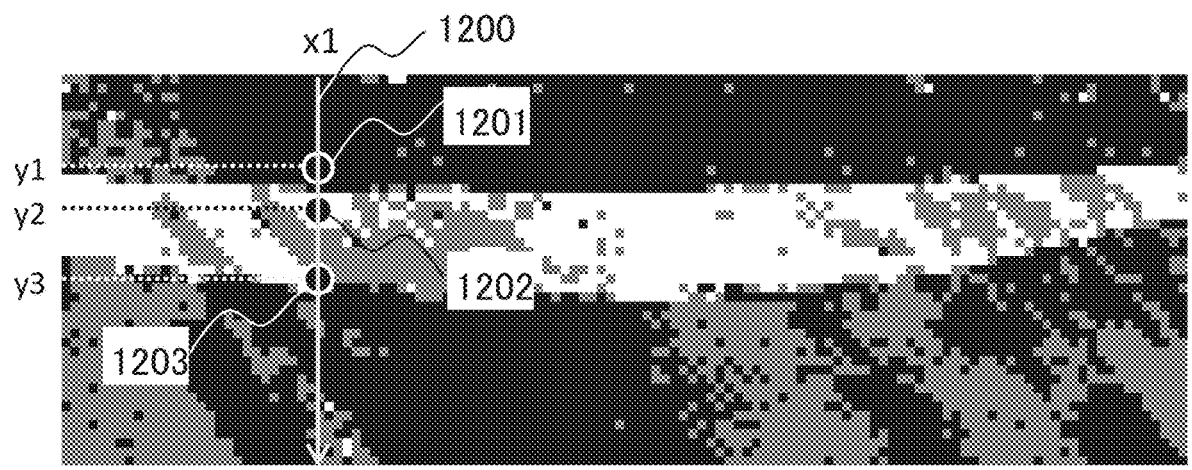
FIG. 12 is a diagram for explaining an example of extracting rise points and fall points.

FIG. 12 is a diagram for explaining an example of rise points and fall points extracted by the feature point candidate extraction unit 205-2. Referring to FIG. 12, part of the portion corresponding to the processing area 1002 in the classified image 1101 is taken out and shown. The feature point candidate extraction unit 205-2: sequentially selects a pair of pixels regarding which their x-coordinates are the same and the difference between their y-coordinates is 1 as explained earlier; and extracts a point(s) where the classification result changes, as a rise point or a fall point. Accordingly, for example, when a point(s) at which the classification result changes is searched for along a scanning direction 1200 with respect to each pixel whose x-coordinate value is x1 as illustrated in FIG. 12, a rise point 1201, a fall point 1202, and a fall point 1203 are extracted. The rise point 1201 is the point where its classification changes from the "road surface" to the "white line." The fall point 1202 is the point where its classification changes from the "white line" to "indefinite." The fall point 1203 is the point where its classification changes from "indefinite" to the "road surface." Incidentally, the fall point 1202 corresponds to a shadow part on the white line. Accordingly, the fall point may sometimes be extracted not only at the boundary between the white line and the road surface, but also the shadow part on the white line. The rise points and the fall points which are extracted in this way by scanning to the lower end of the processing area 1002, that is, to the point where the y-coordinate becomes maximum are buffered as the feature point candidates, respectively.

Figure 13:
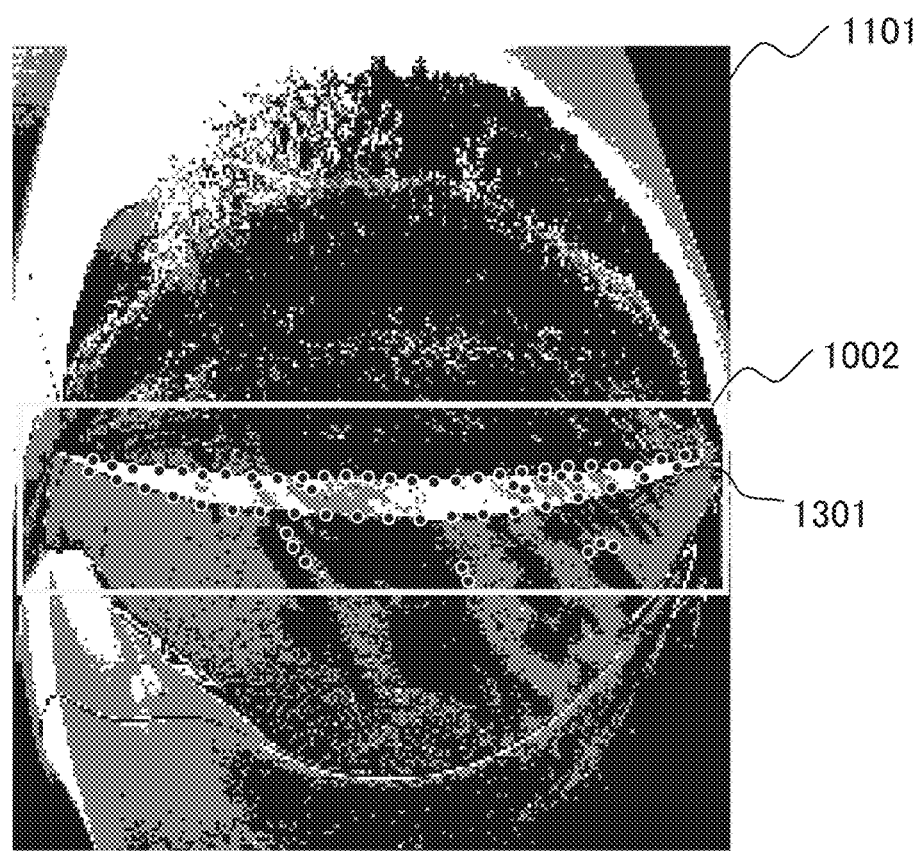
FIG. 13 is a diagram for explaining an example of the result of extracting the rise points and the fall points.

After the above-described processing for extracting the rise points and the fall points with respect to the entire processing area 1002 in the classified image 1101 is terminated, the result illustrated in FIG. 13 is obtained. FIG. 13 is a diagram for explaining an example of the result of extracting the rise points and the fall points. In FIG. 13, the rise points and the fall points which are extracted within the processing area 1002 in the classified image 1101 are represented by the respective black points represented by a point indicated with the reference numeral 1301.

The feature point decision unit 205-3 checks the positional relationship between the respective rise points and fall points which are extracted as the feature point candidates from the classified image 1101 against the division line standard data 204 and decides feature points from among these points. For example, regarding the rise point 1201, the fall point 1202, and the fall point 1203 illustrated in FIG. 12, the positional relationship between the rise point 1201 and the fall point 1202 and the positional relationship between the rise point 1201 and the fall point 1203 are respectively checked against the width (or thickness) of the white line indicated by the division line standard data 204. As a result, the distance between the rise point 1201 and the fall point 1202 does not make sense as the width of the white line, so that this combination is judged as inappropriate as representing the outline of the white line and information of the fall point 1202 is not recorded in the feature point information. On the other hand, the distance between the rise point 1201 and the fall point 1203 substantially matches the width of the white line, so that this combination is judged as appropriate as representing the outline of the white line and information of the fall point 1203 is recorded in the feature point information. Incidentally, under this circumstance, information of the fall point positioned more closer to the driver's own vehicle, in the combination of the rise point and the fall point which is judged as appropriate, is recorded in the feature point information; however, as explained earlier, information of the rise point may be recorded in the feature point information or information of both the rise point and the fall point may be recorded in the feature point information.

Figure 14:
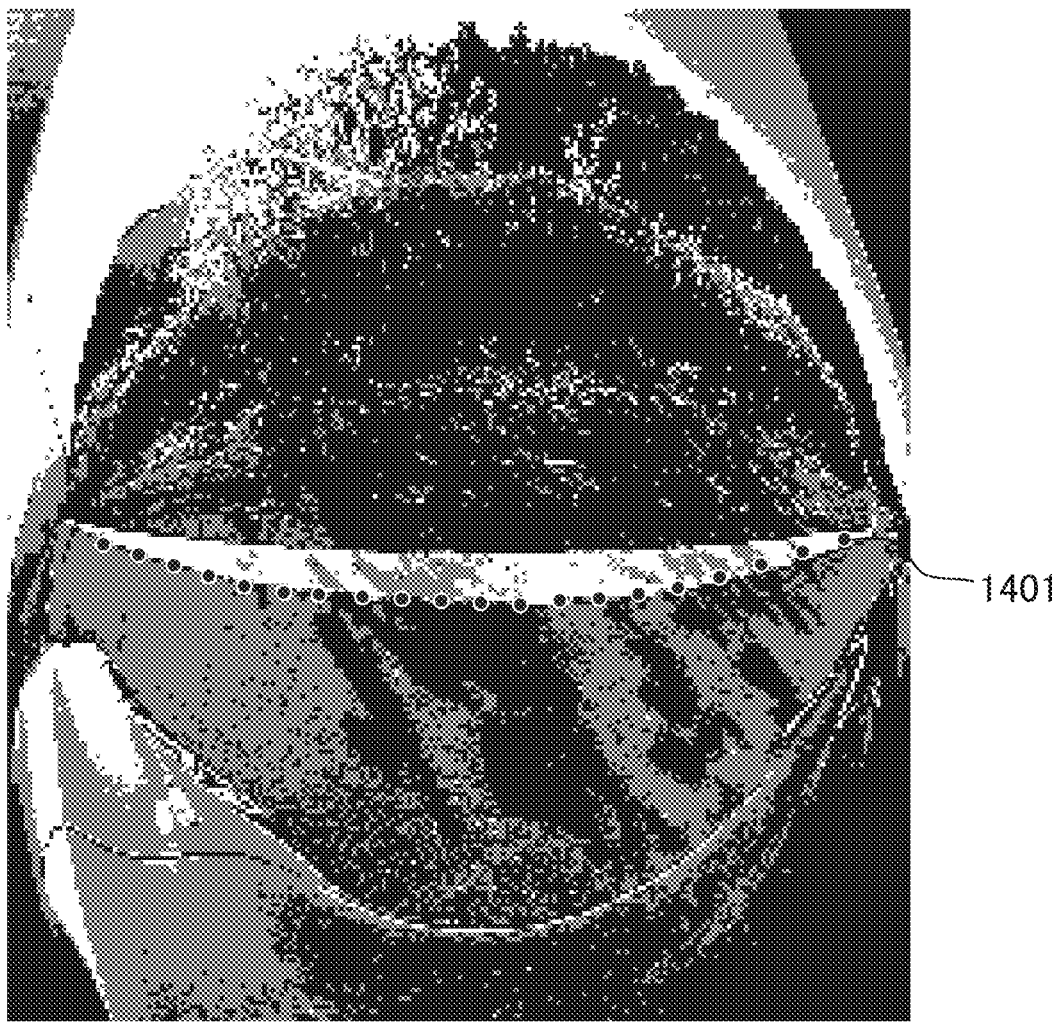
FIG. 14 is a diagram illustrating an example of a feature point decision result in the entire processing area.

FIG. 14 is a diagram illustrating an example of the feature point decision result in the entire processing area 1002 in the classified image 1101. In FIG. 14, each feature point decided by a fall point regarding which the distance between that fall point and its corresponding rise point substantially matches the width of the white line is represented by each black point represented by a point indicated with the reference numeral 1401.

According to the above-described first embodiment of the present invention, the following operational advantages are obtained.

(1) The division line recognition apparatus 1 is an apparatus for recognizing a division line on a road from an image captured by the camera 101. The division line recognition apparatus 1 includes: the processing area setting unit 201 that sets a processing area to the image; the statistics calculation unit 202 that calculates statistics of the image in the processing area; the threshold value setting unit 203 that sets a plurality of threshold values, that is, the white line threshold value and the road surface threshold value on the basis of the statistics; the division line feature point extraction unit 205 that classifies a plurality of pixels contained in the image on the basis of the white line threshold value and the road surface threshold value and extracts feature points of the division line on the basis of classification results of the plurality of pixels; and a division line decision unit 206 that decides the division line on the basis of the feature points extracted by the division line feature point extraction unit 205. Consequently, the accuracy in recognizing the division line on the road can be improved.

(2) The statistics calculation unit 202 calculates the average value and the standard deviation of the luminance value of each pixel of the image in the processing area as the statistics (step 303 in FIG. 3). Consequently, it is possible to calculate the statistics which are required to set the white line threshold value and the road surface threshold value appropriately.

(3) The division line feature point extraction unit 205 causes the feature point candidate extraction unit 205-2 to extract points corresponding to the boundary at which the classification of the plurality of pixels contained in the image changes, as feature point candidates (steps 502 to 506 in FIG. 5). Consequently, appropriate points can be extracted as the feature point candidates by using the classification results of the pixels by the classification unit 205-1.

(4) The division line feature point extraction unit 205 causes the classification unit 205-1 to classify the plurality of pixels contained in the image into any one of at least three types, that is, the "road surface," the "white line," and "indefinite" (steps 601 to 606 in FIG. 6). Consequently, it is possible to perform the classification suited to extract the feature point candidates from the plurality of pixels contained in the image by using the plurality of threshold values which are set by the threshold value setting unit 203.

(5) The division line feature point extraction unit 205 causes the feature point candidate extraction unit 205-2 to extract the plurality of feature point candidates on the basis of the classification results of the plurality of pixels contained in the image (steps 502 to 506 in FIG. 5) and causes the feature point decision unit 205-3 to decide the feature points from the feature point candidates on the basis of the positional relationship between the plurality of extracted feature point candidates (steps 701 to 707 in FIG. 7). Consequently, points which seem to be certain as those representing the outline of the while line can be decided as the feature points from among the feature point candidates extracted from the image.

Second Embodiment

Next, a second embodiment of the present invention will be explained. In this embodiment, an explanation will be provided about an example in which a division line on the road is recognized by using a plurality of images captured in chronological order. Incidentally, the hardware configuration and functional configuration of a division line recognition apparatus according to this embodiment are respectively the same as those explained in the first embodiment, so that an explanation about them has been omitted in the following explanation.

Figure 15:
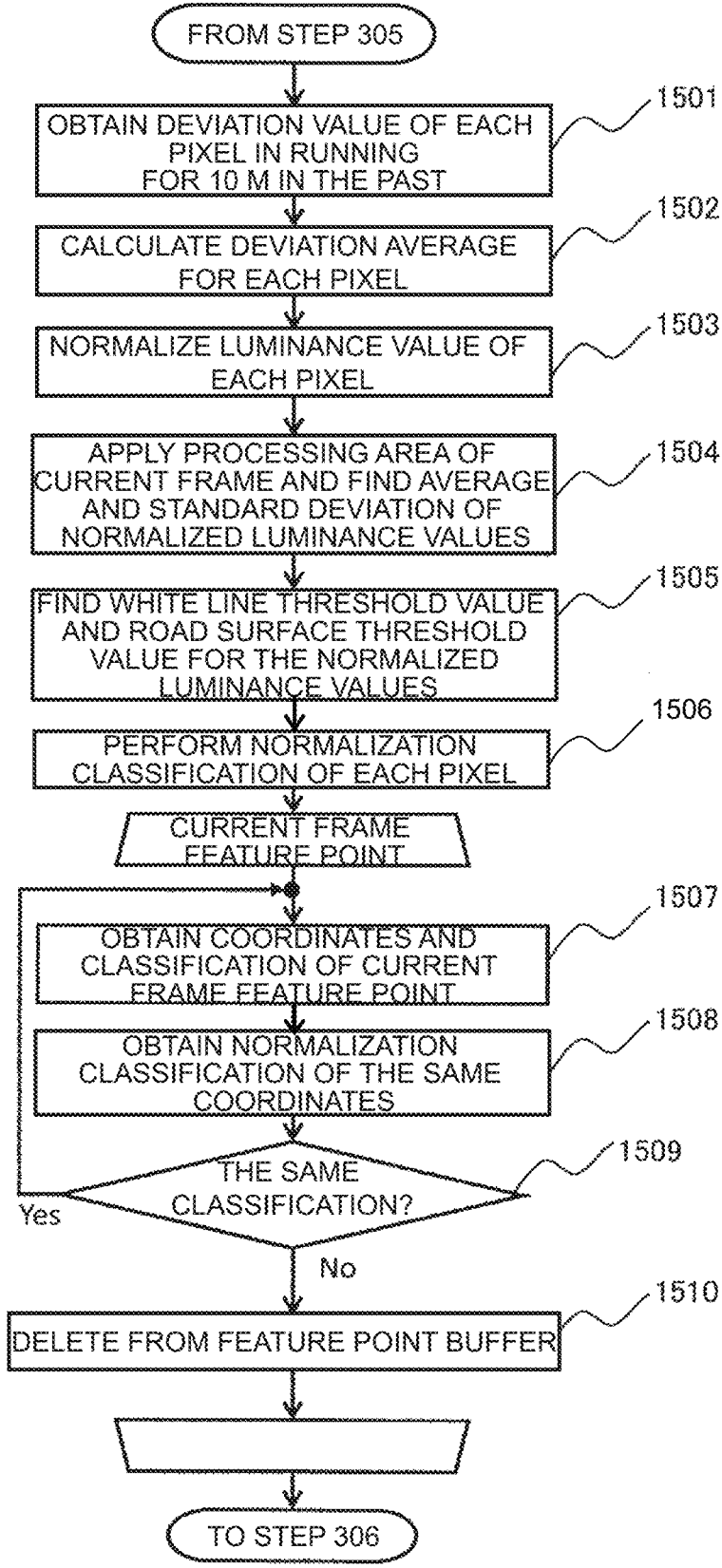
FIG. 15 is a diagram illustrating a processing flow of a division line recognition apparatus according to a second embodiment of the present invention.

FIG. 15 is a diagram illustrating a processing flow of a division line recognition apparatus according to a second embodiment of the present invention. With the division line recognition apparatus 1 according to this embodiment, the CPU 104 executes a processing flow illustrated in FIG. 15 following the processing in step 305 in FIG. 3. In this processing flow, pixels which are classified, respectively, as any one of the "road surface," the "white line," and "indefinite" and tend to easily appear, are identified by executing statistic processing on images acquired in the past; and whether the classification results of the current frame are likely to be certain or not is judged by checking the above-identified pixels against the classification results of the current frame.

In step 1501, the statistics calculation unit 202 is caused to find a deviation value of the luminance of each pixel in a plurality of images acquired in the past. Under this circumstance, by targeting all frames of a specified distance for which the vehicle equipped with the division line recognition apparatus 1 traveled in the past, for example, all the frames of 10 m in the past, the deviation value of the luminance of each pixel is found for each frame. The deviation value of the luminance of each pixel can be calculated by using an average value and a standard deviation which are calculated from the luminance value of each pixel within the processing area which is set in the relevant frame, for example, according to the following formula.

Deviation Value=(Luminance Value−Average Value)/ Standard Deviation

In step 1502, the statistics calculation unit 202 is caused to calculate the deviation average of each pixel by using the deviation value of the luminance of each pixel, which was found for each frame in step 1501. Under this circumstance, the deviation average of each pixel is calculated by targeting all the frames of 10 m in the past, regarding which the deviation value of the luminance of each pixel was found in step 1501, and averaging the deviation values of the luminance in all the frames with respect to each pixel.

In step 1503, the statistics calculation unit 202 is caused to normalize the luminance value of each pixel in the plurality of images acquired in the past by using the deviation average of each pixel as calculated in step 1502. Under this circumstance, the luminance value of each pixel is normalized according to the range of values which the luminance value of each pixel in all the frames of 10 m in the past can become. Accordingly, for example, the luminance value of each pixel in all the frames of 10 m in the past is normalization within the range from 0 to 255. In subsequent processing, the white line threshold value and the road surface threshold value are set by using the thus-normalized luminance value of each pixel.

In step 1504, the statistics calculation unit 202 is caused to apply the processing area of the current frame to all the frames of 10 m in the past regarding which the luminance value was normalized in step 1503. Then, an average and standard deviation of the normalized luminance value, which was found in step 1503, are found with respect to a plurality of pixels contained in that processing area. Accordingly, the statistics of the image in the processing area are calculated by using the plurality of images respectively captured by the camera 101 at different times of day.

In step 1505, the threshold value setting unit 203 is caused to set the white line threshold value and the road surface threshold value by using the statistics of the normalized luminance value found in step 1504, that is, the average and the standard deviation.

Under this circumstance, the white line threshold value and the road surface threshold value are set with respect to the normalized luminance value by a method similar to that explained in the first embodiment on the basis of the average and the standard deviation of the normalized luminance value of each pixel.

In step 1506, the division line feature point extraction unit 205 is caused to perform normalized classification of each pixel in the processing area of all the frames of 10 m in the past by using the white line threshold value and the road surface threshold value which were set in step 1504. Under this circumstance, the classification unit 205-1 is caused to classify each pixel into any one of the "road surface," the "white line," and "indefinite" by executing processing similar to those in steps 601 to 606 in FIG. 6 as explained in the first embodiment by using the normalized luminance value of each pixel in the processing area, which was found in step 1503.

As a result of the above-described processing in steps 1501 to 1506, the classification results similar to those of the current frame can be obtained as the normalized classification result of each pixel with respect to the frames of the specified distance for which the vehicle traveled in the past. In subsequent processing, whether each feature point can be trustworthy or not is judged by comparing this normalized classification result with the classification result of each feature point extracted from the current frame.

In steps 1507 to 1510, the feature point decision unit 205-3 is caused to execute the following processing on each feature point extracted from the current frame.

In step 1507, the coordinates and classification of the relevant feature point which is a processing object are obtained. Under this circumstance, the coordinates and classification of the relevant feature point are obtained by acquiring the feature point information finally obtained by the processing in FIG. 7 from the feature point buffer in FIG. 9 and extracting information corresponding to the feature point, which is the processing object, from that feature point information.

In step 1508, the normalized classification at the same coordinates is obtained on the basis of the coordinates of the feature point in the current frame, which were acquired in step 1507. Under this circumstance, the normalized classification result corresponding to the coordinates of the feature point in the current frame is selected and obtained from among the normalized classification results obtained in step 1506.

In step 1509, the classification of the feature point in the current frame which was obtained step 1507 is compared with the normalized classification obtained in step 1508. As a result, if these classifications are different, the information of the relevant feature point is deleted from the feature point buffer in step 1510 and then the processing returns to step 1507 and proceeds to the processing targeted at the next feature point. On the other hand, if it is determined in step 1509 that these classifications are the same, the processing returns to step 1507 without doing anything, so that the information of the relevant feature point is retained in the feature point buffer and the processing proceeds to the processing targeted at the next feature point.

In steps 1507 to 1510, the classification result of each feature point is compared with the past frames by executing the above-described processing on each feature point extracted from the current frame. Accordingly, it is possible to recognize which classification tends to easily appear at each coordinate in the image; and if any feature point which is different from that tendency is extracted from the current frame, that feature point can be removed as noise.

According to the above-described second embodiment of the present invention, the following operational advantage can be further obtained in addition to the respective operational advantages (1) to (5) as explained in the first embodiment.

(6) The division line feature point extraction unit 205 classifies the plurality of pixels contained in each of the plurality of images captured by the camera 101 at different times of day; and if the same classification result is obtained between the corresponding pixels in the plurality of images, a feature point of the division line is extracted by using the classification result of such pixels. Specifically speaking, the statistics calculation unit 202 calculates the statistics with respect to the plurality of images in the past (steps 1501 to 1504 in FIG. 15). The division line feature point extraction unit 205 classifies the plurality of pixels contained in the plurality of images in the past on the basis of the statistics calculated by the statistics calculation unit 202 (step 1506) and compares the classification results with the classification results of the plurality of pixels contained in the image of the current frame captured by the camera 101 later than the plurality of images in the past (steps 1507 to 1509). As a result, if the same classification result is obtained between the corresponding pixels (step 1509: Yes), the feature point of the division line is extracted by using the classification result of the relevant pixel by retaining the information of the relevant pixel without deleting it from the feature point buffer. Consequently, the feature point of the division line can be extracted more accurately from the current frame by using the images captured in the past.

Incidentally, the aforementioned embodiments have described the division line recognition apparatus 1 which is mounted in the vehicle as an example; however, the present invention is not limited to this example. For example, the present invention can be also applied to a case where an image captured by the camera mounted in the vehicle is transmitted to a server and the server receives that image and recognizes the division line on the road. In this case, the server which is not mounted in the vehicle serves as the division line recognition apparatus according to the present invention. Besides this, the present invention can be implemented by any arbitrary form.

Furthermore, in the above-explained embodiments, the functions of the division line recognition apparatus 1 are implemented by execution of programs by the CPU 104; however, the present invention is not limited to this example. For example, some or all the functions of the division line recognition apparatus 1 may be implemented by using an FPGA (Field-Programmable Gate Array). Besides this, the division line recognition apparatus according to the present invention can be implemented by any arbitrary hardware configuration.

The aforementioned embodiments have explained the example in which each pixel in the image is classified into any one of the "road surface," the "white line," and "indefinite" by using the white line threshold value and the road surface threshold value; however, the present invention is not limited to this example. As long as each pixel in the image can be classified into at least two types, preferably three or more types, any arbitrary number of threshold values can be set and each pixel in the image can be classified into the arbitrary number of classifications according to such threshold values.

The above-described embodiments and various kinds of variations are merely examples. The present invention is not limited to the above-described embodiments unless they impair the features of the present invention; and other aspects which can be thought of within the scope of the technical idea of the present invention are also included within the scope of the present invention.

REFERENCE SIGNS LIST

1: division line recognition apparatus
101: camera
103: storage apparatus
104: CPU
105: memory
106: CAN I/F
107: CAN bus
108: vehicle control unit
201: processing area setting unit
202: statistics calculation unit
203: threshold value setting unit
204: division line standard data
205: division line feature point extraction unit
206: division line decision unit

The invention claimed is:

1. An apparatus for recognizing a division line on a road from an image captured by a camera, the apparatus comprising:
a processing area setting unit configured to set a processing area to the image;
a statistics calculation unit configured to calculate statistics of the image in the processing area;
a threshold value setting unit configured to set a plurality of threshold values on the basis of the statistics;
a division line feature point extraction unit configured to classify a plurality of pixels contained in the image on the basis of the plurality of threshold values to distinguish between a road surface and a white line and extracts a feature point of the division line on the basis of classification results of the plurality of pixels; and
a division line decision unit configured to decide the division line on the basis of the feature point extracted by the division line feature point extraction unit,
wherein the division line feature point extraction unit defines the pixels which cannot be classified as either the road surface or the white line, as indefinite classification and recognizes the pixels which are the indefinite classification as the road surface or the white line according to a classification change of the pixels in a scanning direction of the image.

2. The division line recognition apparatus according to claim 1, wherein the statistics calculation unit defines a portion or entire of the image as a processing area and calculates an average value and a standard deviation of a luminance value of each of the pixels in the processing area as the statistics.

3. The division line recognition apparatus according to claim 1, wherein the statistics calculation unit defines a portion or entire of the image as a processing area and calculates a median value and a median absolute deviation of a luminance value of each of the pixels in the processing area, as the statistics.

4. The division line recognition apparatus according to claim 1, wherein the division line feature point extraction unit extracts a point corresponding to a boundary at which the classification of the plurality of pixels changes, as a candidate for the feature point.

5. The division line recognition apparatus according to claim 1, wherein the division line feature point extraction unit extracts a plurality of feature point candidates on the basis of classification results of the plurality of pixels and decides the feature point from the feature point candidates on the basis of a positional relationship between the plurality of extracted feature point candidates.

6. The division line recognition apparatus according to claim 1, wherein the division line feature point extraction unit classifies a plurality of pixels contained in a plurality of images captured by the camera at different times; and when the same classification result is obtained between corresponding pixels in the plurality of images, the division line feature point extraction unit extracts the feature point of the division line by using the classification result of such pixels.

7. The division line recognition apparatus according to claim 6, wherein the statistics calculation unit calculates the statistics about the plurality of images in the past; and wherein when the division line feature point extraction unit compares classification results of the plurality of pixels contained in the plurality of images previously captured by the camera on the basis of the statistics calculated by the statistics calculation unit with classification results of the plurality of pixels contained in an image subsequently captured by the camera and when the same classification result is obtained between the corresponding pixels in the plurality of images previously captured and subsequently captured by the camera, the division line feature point extraction unit extracts the feature point of the division line by using the classification result of such pixels.

\* \* \* \* \*